（12）United States Patent
Ballard et al.

(10) Patent No.: US 9,399,953 B2
(45) Date of Patent: Jul. 26, 2016

(54) GAS TURBINE ENGINE FUEL SYSTEM PUMP SHARING VALVE

(71) Applicant: Hamilton Sundstrand Corporation, Windsor Locks, CT (US)

(72) Inventors: Peter M. Ballard, Enfield, CT (US); Chris Bonn, Hartford, CT (US); Floyd Richard Emmons, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 954 days.

(21) Appl. No.: 13/622,503

(22) Filed: Sep. 19, 2012

(65) Prior Publication Data

US 2014/0076435 A1    Mar. 20, 2014

(51) Int. Cl.
    *F02C 7/232*    (2006.01)
    *F02C 7/236*    (2006.01)
    *F16K 11/07*    (2006.01)

(52) U.S. Cl.
    CPC ............ *F02C 7/232* (2013.01); *F02C 7/236* (2013.01); *F16K 11/0712* (2013.01); *F16K 11/0716* (2013.01); *Y10T 137/85986* (2015.04); *Y10T 137/86863* (2015.04)

(58) Field of Classification Search
    CPC .......... F02C 7/232; F02C 7/236; F02C 9/263; F23R 3/28; F16K 3/24; F16K 3/26; F16K 3/262; F16K 3/265; F16K 11/07; F16K 11/0716
    See application file for complete search history.

(56) References Cited

U.S. PATENT DOCUMENTS

| | | | |
|---|---|---|---|
| 4,607,486 A | 8/1986 | Cole | |
| 4,745,747 A | 5/1988 | Krausse et al. | |
| 5,110,269 A | 5/1992 | Fallon | |
| 5,159,808 A | 11/1992 | Kast | |
| 5,168,704 A | 12/1992 | Kast et al. | |
| 5,245,819 A | 9/1993 | Kast | |
| 5,595,218 A * | 1/1997 | Hallbach et al. | 137/625.18 |
| 6,666,015 B2 | 12/2003 | Dyer | |
| 7,094,042 B1 | 8/2006 | Borgetti et al. | |
| 7,165,949 B2 | 1/2007 | Firnhaber | |
| 7,637,724 B2 | 12/2009 | Cygnor | |
| 2010/0058733 A1 * | 3/2010 | Lawrence et al. | 60/39.094 |
| 2011/0289925 A1 | 12/2011 | Dyer et al. | |
| 2013/0283763 A1 * | 10/2013 | Podgorski et al. | 60/39.281 |

* cited by examiner

*Primary Examiner* — Andrew Nguyen

(74) *Attorney, Agent, or Firm* — Carlson, Gaskey & Olds, P.C.

(57) ABSTRACT

A pump sharing valve for a gas turbine engine fuel system includes a housing having multiple ports. A sleeve is arranged in the housing and includes an inlet window and first, second and third windows axially spaced apart from one another. A spool is slidably received in the sleeve and includes a diameter and first and second cylindrical portions. The first cylindrical portion selectively connects the inlet window to the second and third windows. The second cylindrical portion selectively connects the inlet window to the first window. The spool is movable between first and second positions relative to the first, second and third windows to regulate flow. The first and second cylindrical portions respectively includes first and second widths. A first ratio corresponds to the first width to the spool diameter and a second ratio corresponds to the second width to the spool diameters. The first ratio is between 1.83 and 1.93 and the second ratio is between 1.22 and 1.32.

11 Claims, 4 Drawing Sheets

| STROKE | WINDOW A AS A % OF TOTAL WINDOW A AREA | WINDOW B AS A % OF TOTAL WINDOW A AREA | WINDOW C AS A % OF TOTAL WINDOW A AREA |
|---|---|---|---|
| 0% (ON MIN STOP) | 0% | 7% | 0% |
| 10% | 0% | 3% | 0% |
| 20% | 1% | 0% | 1% |
| 30% | 6% | 0% | 1% |
| 40% | 14% | 0% | 3% |
| 50% | 27% | 0% | 5% |
| 60% | 42% | 0% | 10% |
| 70% | 56% | 0% | 17% |
| 80% | 70% | 0% | 28% |
| 90% | 86% | 0% | 41% |
| 100% (ON MAX STOP) | 100% | 0% | 49% |

FIG.5

GAS TURBINE ENGINE FUEL SYSTEM PUMP SHARING VALVE

BACKGROUND

This disclosure relates to a fuel system wherein a servo gear pump and a main gear pump act in cooperation in distinct manners dependent on varying system conditions. More particularly, the disclosure relates to a pump sharing valve for the system.

Gas turbine engines are known, and typically include a compressor compressing air and delivering it to a combustor. The compressed air is mixed with fuel in the combustor, combusted, and the products of combustion pass downstream over turbine rotors, driving the rotors to create power.

There are many distinct features involved in a gas turbine engine. As one example only, the compressor may be provided with variable vanes which are actuated to change an angle of incident dependent on system conditions. Actuators for changing the angle of incidence of the vanes are provided with hydraulic fluid from a servo gear pump. Further, a main gear pump is utilized to deliver fuel into the combustion chamber. It is known in gas turbine engines that fuel can be used as the hydraulic fluid in the accessory actuators.

In a known system, the operation of the servo gear pump requires especially high flow at start conditions. However, under more steady state operation, the servo gear pump does not necessarily need to move as much fluid to the accessory actuators. On the other hand, the main gear pump for supplying fuel to the combustion chamber does not necessarily need as much flow at the start of operation. It does increase its flow needs as the engine continues to operate. Thus, it is known to provide a "minimum pressure valve" on a line downstream of the servo gear pump. After the servo gear pump has built up its pressure, the valve opens and then fuel from the servo gear pump can supplement the fuel from the main gear pump being delivered into the combustion chamber.

As the number, and complexity of the accessories associated with a gas turbine engine increases, the size of the servo gear pump necessary to supply adequate fuel to each of the actuators is also increasing.

SUMMARY

In one exemplary embodiment, a pump sharing valve for a gas turbine engine fuel system includes a housing having multiple ports. A sleeve is arranged in the housing and includes an inlet window and first, second and third windows axially spaced apart from one another. A spool is slidably received in the sleeve and includes a diameter and first and second cylindrical portions. The first cylindrical portion selectively connects the inlet window to the second and third windows. The second cylindrical portion selectively connects the inlet window to the first window. The spool is movable between first and second positions relative to the first, second and third windows to regulate flow. The first and second cylindrical portions respectively include first and second widths. A first ratio corresponds to the first width to the spool diameter and a second ratio corresponds to the second width to the spool diameters. The first ratio is between 1.83 and 1.93 and the second ratio is between 1.22 and 1.32.

In another exemplary embodiment, a fuel system for a gas turbine engine includes a first pump for delivering fuel to a first use on a gas turbine engine. The fuel system includes a second pump for delivering fuel to a second use on the gas turbine engine. A valve allows flow from the first pump to be delivered to the first use, but also routes some flow from the first pump to supplement fuel flow from the second pump until a pressure downstream of the second pump increases. The valve then allows flow from the second pump to flow to the first use to supplement the flow from the first pump. The valve includes a spool movable between first and second positions to regulate flow between the first and second pumps. The spool includes a diameter and first and second cylindrical portions. The first and second cylindrical portions respectively include first and second widths. A first ratio corresponds to the first width to the spool diameter and a second ratio corresponds to the second width to the spool diameters. The first ratio is between 1.83 and 1.93 and the second ratio is between 1.22 and 1.32.

In another exemplary embodiment, a gas turbine engine includes at least one actuator for an accessory associated with a gas turbine engine. The gas turbine engine includes a combustion chamber. A first pump delivers fuel to the combustion chamber. A second pump delivers fuel to the at least one actuator. A valve allows flow from the first pump to be delivered to the combustion chamber, but also routes some flow from the first pump to supplement fuel flow from the second pump to the at least one actuator until a pressure downstream of the second pump increases. The valve then allows flow from the second pump to flow to the combustion chamber to supplement the flow from the first pump.

BRIEF DESCRIPTION OF THE DRAWINGS

The disclosure can be further understood by reference to the following detailed description when considered in connection with the accompanying drawings wherein:

FIG. 5 illustrates in tabular form the flow regulating area of the ports in the sleeve versus a stroke of the spool.

DETAILED DESCRIPTION

Figure 1A:
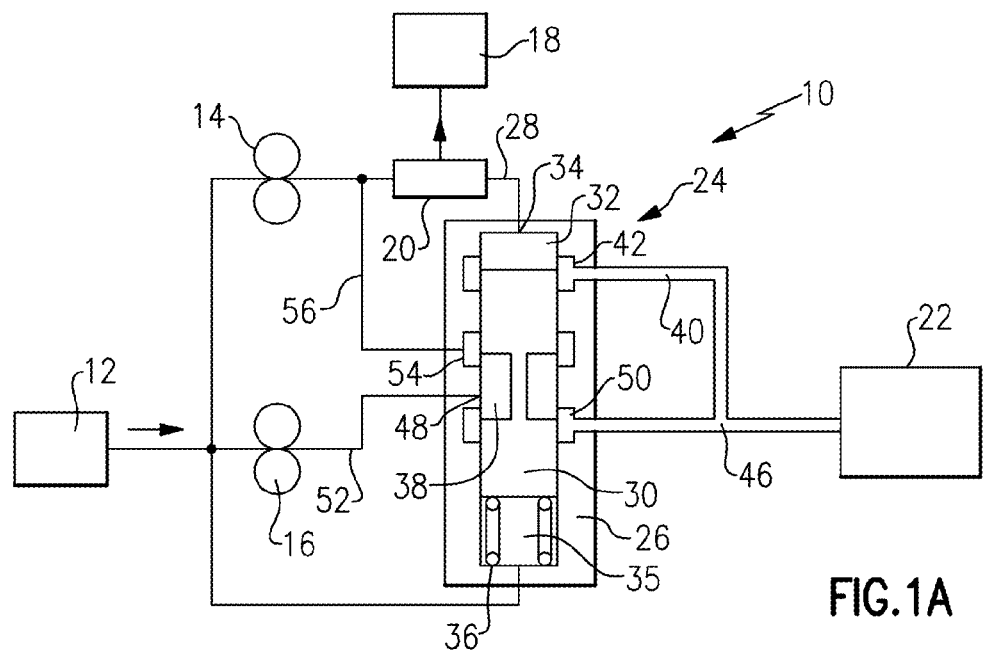
FIG. 1A shows a fuel system for a gas turbine engine in a first condition.

FIG. 1A shows a fuel system 10 for use on an aircraft, and for supplying fuel to a gas turbine engine 22. As shown, a fuel tank 12 delivers fuel to each of a main gear pump 16, and a servo gear pump 14. While gear pumps are disclosed, the disclosed arrangement may also use other types of pumps. The main gear pump 16 primarily provides fuel to the gas turbine engine 22, and in particular its combustion chamber.

The servo gear pump 14 delivers fuel into a filter 20, and then to accessory actuators 18. The accessory actuators 18 can be any number of components, and as one example only, may be a variable vane actuator for use in a compressor section in the gas turbine engine 22.

Figure 3:
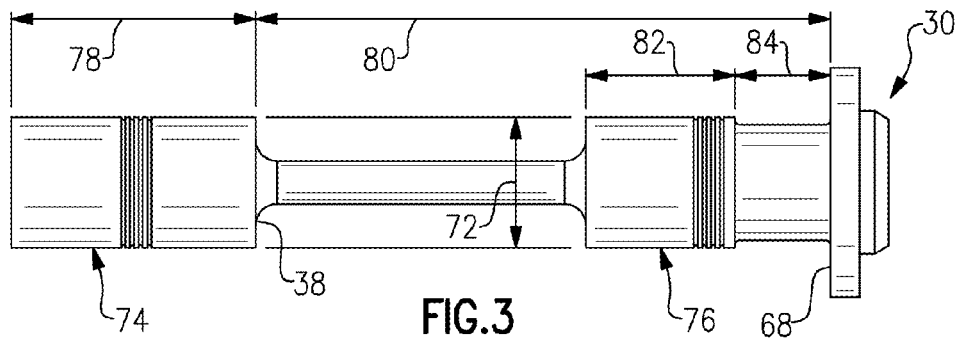
FIG. 3 is an elevational view of the spool.

In fuel system 10, a valve 24 is incorporated. A line 28 downstream of the filter 20 communicates with a chamber 32 through a port 34, wherein a pressure acts in opposition to a spring 36 and a drain pressure in spring chamber 35 (also referred to generally as a bias force) on a spool 30. As shown, spool 30 is provided with an intermediate groove 38 provided between first and second cylindrical portions 74, 76 (FIG. 3).

A line 40 downstream of a housing groove or port 42 in a valve housing 26 of valve 24 supplements a main fuel flow line 46 downstream of the main gear pump 16.

The FIG. 1A position illustrates a start condition wherein fuel must be provided in greater volume to the accessory actuators 18. Notably, it should be understood that the fuel provided to the accessory actuators 18 is utilized generally as a hydraulic fluid, and is not combusted. On the other hand, the fuel delivered to the gas turbine engine 22 is largely combusted at the combustion section.

In the position illustrated in FIG. 1A, the spool 30 blocks flow from the chamber 32 through the port 42 and into line 40. Thus, in this condition, fuel delivered to the gas turbine engine 22 flows only from a port 48 at the end of the line 52, into the intermediate groove 38, into housing groove or port 50 and then into line 46. Ports 50 and 42 are timed together so when port 42 is blocked, so is port 50. During start conditions, ports 50 and 42 are almost closed, but are slightly open. Flow will leave from both ports 50 and 42 under start conditions, and the backpressure created by blocking the ports 42, 50 drives flow into port 54 and into the actuators.

However, the intermediate groove 38 is also positioned to communicate fuel from the line 52 into the housing groove or port 54. That fuel passes into line 56, and supplements the flow downstream of the servo gear pump 14 being delivered to the accessory actuators 18. Thus, at start conditions, the accessory actuators 18 receive fuel not only from the servo gear pump 14, but also from the main gear pump 16. Fluid is also moved by the main gear pump 16 to line 46, and is adequate for providing fuel for combustion at these start conditions.

Figure 1B:
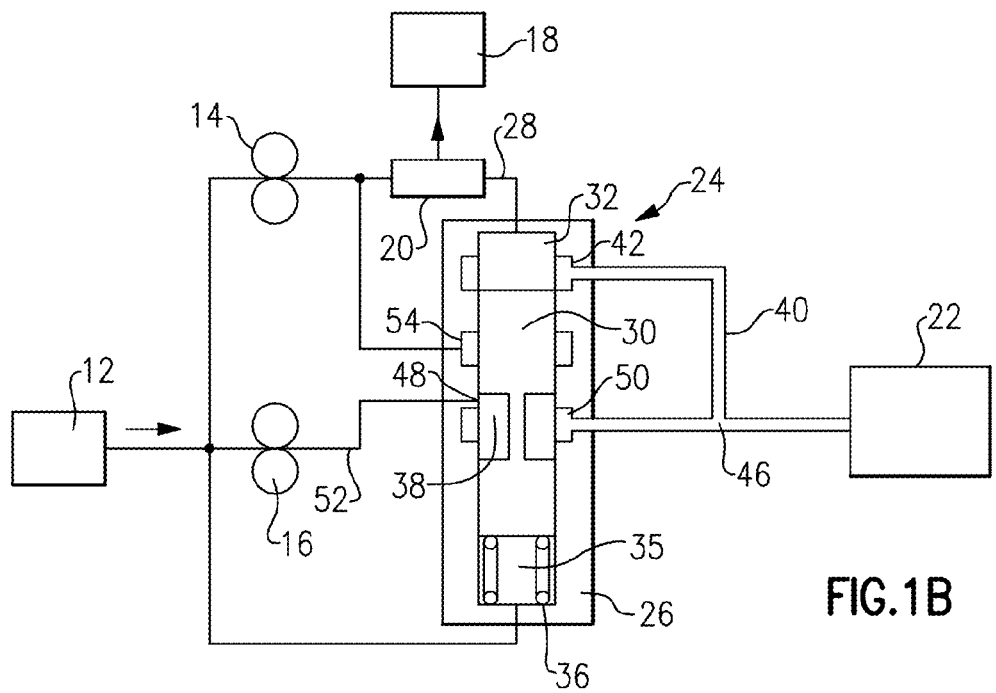
FIG. 1B shows the fuel system for the gas turbine engine in a steady state condition.

Eventually, the accessory actuators 18 are moved to desired positions, and the amount required to be delivered to the accessory actuators 18 is reduced. At that point, the pressure on line 28 and delivered into chamber 32 increases. The spool 30 then moves to a position such as shown in FIG. 1B. In the FIG. 1B position, the intermediate groove 38 communicates line 52 entirely into the port 50, and the line 46. The flow from the intermediate groove 38 no longer communicates with port 54, and thus the main gear pump 16 no longer supplements the servo gear pump 14.

In the FIG. 1B position, the chamber 32 communicates with the port 42. Thus, fuel being moved by the servo gear pump 14 now supplements the main gear pump 16 by passing from housing groove 42, into line 40, and then combining with the fuel flow on line 46 being delivered to the gas turbine engine 22.

Figure 2:
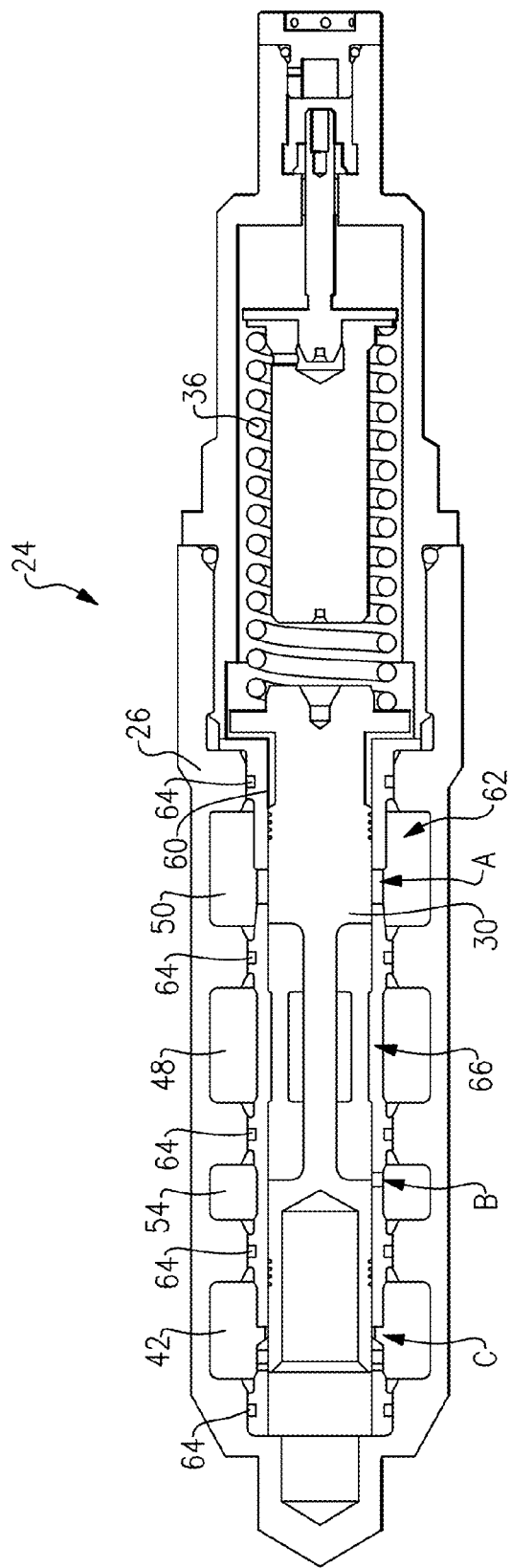
FIG. 2 is a cross-sectional view of a pump sharing valve with a housing, sleeve and spool.
Figure 4A:
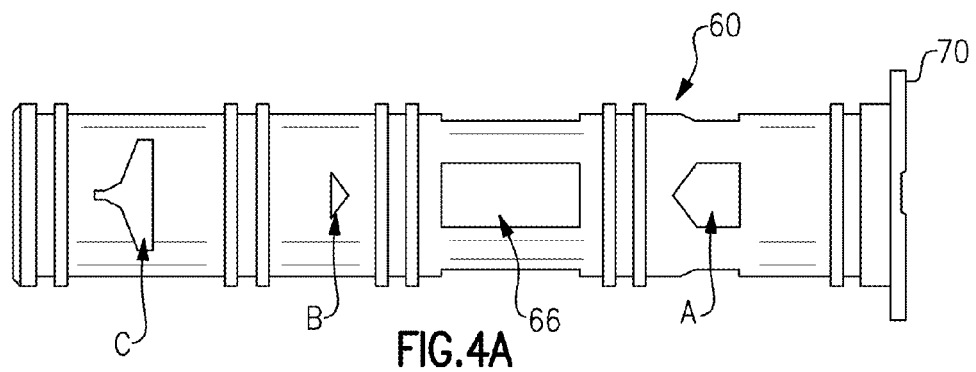
FIG. 4A is an elevational view of the sleeve.
Figure 4B:
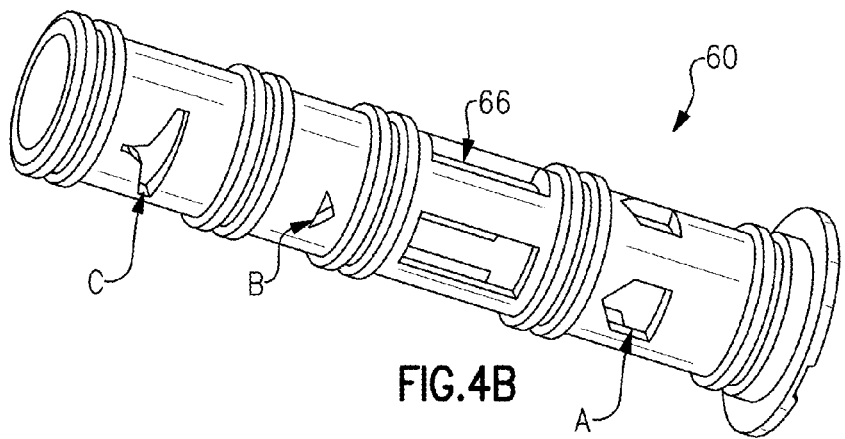
FIG. 4B is a perspective view of the sleeve illustrating various ports.

The valve 24 is shown in more detail in FIG. 2. A sleeve 60 is arranged within a bore 62 of the housing 26. Seals 64 are provided between the sleeve 60 and housing 26 to seal the ports 42, 48, 50, 54 relative to one another. The sleeve 60 (also shown in FIGS. 4A and 4B) includes an inlet window 66 and windows A, B, and C respectively aligned with the ports 48, 50, 54, 42. The spool 30 (also shown in FIG. 3) is slidably received within the sleeve 60 to regulate the flow of fuel through ports based on window area relationships as depicted in FIG. 5.

Referring to FIG. 3, the spool 30 includes first and second cylindrical portions 74, 76, which both have a spool diameter 72. The dimensions and position of the first and second cylindrical portions 74, 76 in relation to the windows A, B, C provide the desired timing for the fuel system 10. The first cylindrical portion 74 includes a first width 78 that is spaced a first distance 80 from a spool surface 68. The spool surface 68 seats against a sleeve surface 70 (FIG. 4A) with the valve 24 shown in the FIG. 1A position. The second cylindrical portion 76 includes a second width 82 that is spaced a second distance 84 from the spool surface 68.

In one example, the ratio of the first width 78 to the spool diameter 72 is 1.83-1.93, and in one example, 1.88. The ratio of the second width 82 to the spool diameter 72 is 1.22-1.32, and in one example, 1.27. The ratio of the first width 78 to the first distance 80 is 0.38-0.48, and in one example, 0.43. The ratio of the second width 82 to the second distance 84 is 2.05-2.15, and in one example, 2.10. In one example, the spool diameter is 0.7-0.8 inch (17.78-20.32 mm).

In the example, the inlet window 66 includes four equally spaced rectangular windows. The window A is provided by four equally spaced "home plate" shaped apertures having an area in the range of 0.400-0.420 inch$^2$ (1.02-1.07 cm$^2$). The window B is provided by two equally spaced triangular apertures, and the window C is provided by two equally spaced "top hat" shaped apertures.

The flow through the windows A-C is depicted in a table of FIG. 5. The 0% stroke corresponds to the position in which the spool surface 68 is seated against the sleeve surface 70. The 10% stroke position corresponds to the FIG. 1A position. The 100% stroke position corresponds to the FIG. 1B position. The window A total area is larger than the window C total area, which is larger than the window B total area.

At the 0% stroke position, the window A and C areas are fully blocked and the window B area is approximately 7% of window A total area. At approximately the 20% stroke position, the window A, B and C areas are approximately the same at about 1% of the total window A total area. From about the 20%-100% stroke position, the window B area is fully closed, and the window A and C areas continue to open a greater amount.

At the 50% stroke position, the window A area is approximately 27% of the window A total area and the window C area is approximately 5% of the window A total area. The opening of the window C area begins to flatten out at approximately the 90% stroke position. At the 100% stroke position, the window A area is fully opened at 100% of the window A total area, and the window C area is approximately 49% of the window A total area. All values are +/−3%.

The windows A-C are contoured and timed with respect to the spool 30 to achieve desired fuel flow and pressure drop for the fuel system 10, in particular, with respect to a fuel sharing configuration between servo and main gear pumps 14, 16.

Although an example embodiment has been disclosed, a worker of ordinary skill in this art would recognize that certain modifications would come within the scope of the claims. For that reason, the following claims should be studied to determine their true scope and content.

What is claimed is:

1. A pump sharing valve for a gas turbine engine fuel system comprising:
   a housing having multiple ports;
   a sleeve arranged in the housing and including an inlet window and first, second and third windows axially spaced apart from one another; and
   a spool slidably received in the sleeve and including a spool diameter and first and second cylindrical portions, the first cylindrical portion selectively connecting the inlet window to the second and third windows, and the second cylindrical portion selectively connecting the inlet window to the first window, the spool movable between first and second positions relative to the first, second and third windows to regulate flow, the first and second cylindrical portions respectively including first and second widths, a first ratio corresponding to the first width to the spool diameter, and a second ratio corresponding to the second width to the spool diameter, the first ratio is between 1.83 and 1.93, and the second ratio is between 1.22 and 1.32, wherein the spool includes a spool surface that engages a sleeve surface in a valve position, the first and second cylindrical portions arranged at first and second distances from the spool surface, a third ratio corresponding to the first width to the first distance, a fourth ratio corresponding to the second width to the second distance, the third ratio between 0.38 and 0.48, and the fourth ratio between 2.05 and 2.15.

2. The valve according to claim 1, wherein the spool diameter is between 0.7 and 0.8 inch (17.78-20.32 mm).

3. The valve according to claim 1, wherein the valve position corresponds to a 0% stroke position, the spool is movable to a 100% stroke position in which the spool and sleeve surface are spaced apart from one another, the first, second and third windows respectively include first, second and third window areas, the first window area greater than the second window area, the second window area greater than the third window area.

4. The valve according to claim 3, wherein at the 0% stroke position, the first and third windows are fully blocked and the second window is open approximately 6 to 8% of the first window area, at approximately 20% stroke position, the first, second and third windows are open approximately the same at about 0-2% of the first window area, and from about 20%-100% stroke position, the second window is fully closed, and the first and third windows continue to open a greater amount.

5. The valve according to claim 3, wherein at 50% stroke position, the first window is open approximately 27% of the first window area and the third window is open approximately 5% of the first window area, the opening of the third window begins to flatten out at approximately 90% stroke position, and at the 100% stroke position, the first window is fully opened at 100% of the first window area, and the third window is open approximately 49% of the first window area.

6. A fuel system for a gas turbine engine comprising:
a first pump for delivering fuel to a first use on the gas turbine engine;
a second pump for delivering fuel to a second use on the gas turbine engine;
a valve allowing flow from the first pump to be delivered to the first use, but also routing some flow from the first pump to supplement fuel flow from the second pump until a pressure downstream of the second pump increases, and the valve then allowing flow from the second pump to flow to the first use to supplement the flow from the first pump, the valve including:
a housing having multiple ports;
a sleeve arranged in the housing and including an inlet window and first, second and third windows axially spaced apart from one another; and
a spool movable between first and second positions to regulate flow between the first and second pumps, the spool including a spool diameter and first and second cylindrical portions, the first cylindrical portion selectively connecting the inlet window to the second and third windows, and the second cylindrical portion selectively connecting the inlet window to the first window, the spool movable between the first and the second positions relative to the first, second and third windows to regulate flow, the first and second cylindrical portions respectively including first and second widths, a first ratio corresponding to the first width to the spool diameter, and a second ratio corresponding to the second width to the spool diameter, the first ratio is between 1.83 and 1.93, and the second ratio is between 1.22 and 1.32, wherein the spool includes a spool surface that engages a sleeve surface in a valve position, the first and second cylindrical portions arranged at first and second distances from the spool surface, a third ratio corresponding to the first width to the first distance, a fourth ratio corresponding to the second width to the second distance, the third ratio between 0.38 and 0.48, and the fourth ratio between 2.05 and 2.15.

7. The fuel system according to claim 6, wherein the first and second pumps are gear pumps.

8. The fuel system according to claim 6, wherein the spool diameter is between 0.7 and 0.8 inch (17.78-20.32 mm).

9. A gas turbine engine comprising:
at least one actuator for an accessory associated with the gas turbine engine; and
a combustion chamber;
a first pump for delivering fuel to the combustion chamber;
a second pump for delivering fuel to the at least one actuator; and
a valve allowing flow from the first pump to be delivered to the combustion chamber, but also routing some flow from the first pump to supplement fuel flow from the second pump to the at least one actuator until a pressure downstream of the second pump increases, and the valve then allowing flow from the second pump to flow to the combustion chamber to supplement the flow from the first pump, the valve including:
a housing having multiple ports;
a sleeve arranged in the housing and including an inlet window and first, second and third windows axially spaced apart from one another; and
a spool slidably received in the sleeve and including a spool diameter and first and second cylindrical portions, the first cylindrical portion selectively connecting the inlet window to the second and third windows, and the second cylindrical portion selectively connecting the inlet window to the first window, the spool movable between first and second positions relative to the first, second and third windows to regulate flow, the first and second cylindrical portions respectively including first and second widths, a first ratio corresponding to the first width to the spool diameter, and a second ratio corresponding to the second width to the spool diameters, the first ratio is between 1.83 and 1.93, and the second ratio is between 1.22 and 1.32, wherein the spool includes a spool surface that engages a sleeve surface in a valve position, the first and second cylindrical portions arranged at first and second distances from the spool surface, a third ratio corresponding to the first width to the first distance, a fourth ratio corresponding to the second width to the second distance, the third ratio between 0.38 and 0.48, and the fourth ratio between 2.05 and 2.15.

10. The gas turbine engine according to claim 9, wherein the first and second pumps are gear pumps.

11. The gas turbine engine according to claim 9, wherein the spool diameter is between 0. and 0.8 inch (17.78-20.32 mm).

* * * * *